May 16, 1961 S. S. WULC 2,984,457

HEAT RADIATOR FOR ELECTRONIC MOUNTING COMPONENTS

Filed April 9, 1958

INVENTOR
STANLEY S. WULC.
BY Harry Sangsam
Stanley Bilker
ATTORNEYS 2,984,457

HEAT RADIATOR FOR ELECTRONIC MOUNTING COMPONENTS

Stanley S. Wulc, Lafayette Hills, Pa., assignor to Vector Manufacturing Company, Inc., Southampton, Pa., a corporation of Pennsylvania Filed Apr. 9, 1958, Ser. No. 727,292

2 Claims. (Cl. 257—263)

My invention relates to a supporting rack and a removable frame wherein electronic or other articles of electrical equipment may be mounted, and wherein heat radiators are located between the supporting rack and removable frame.

In my prior filed application, Serial No. 713,755, filed February 6, 1958, I disclosed a removable frame mounted upon a rack. Where tolerances are not too close the frame and the mounting rack do not tightly abut one another with the result that heat from the electrical component is not rapidly conducted away. Electronic components mounted within the detachable frame may be subjected to excessive heating not only from the electronic components within the frame but also from the other electronic components which are mounted upon the same mounting rack in other frames. The prior art construction may cause the equipment to deteriorate or improperly function because of overheating due to insufficient air circulation.

It is, therefore, an object of my invention to prevent overheating because of insufficient air circulation in and about the mounting rack and the detachable frame which houses the electronic components.

Another object of my invention is to provide a flexible, metallic plate which may be mounted between a mounting rack and a detachable frame whereby air circulation may readily take place between the detachable frame and the mounting rack.

Another object of my invention is to provide a heat conductor between a detachable frame and a mounting rack wherein electronic components are housed, and wherein the heat conductor has separate and individual resilient contacts between the detachable frame and the mounting rack.

Another object of my invention is to provide a new and improved mounting rack for a plurality of detachable frames wherein there is an effective heat disbursing medium wherein overheating otherwise might cause poor performance.

Another object of my invention is to provide means for the dissipation of heat between the detachable frame and the mounting rack whereby the heat may be dissipated not only by being reradiated from a shield, but also by being effectively conducted through the detachable frame, the shield, and the mounting rack.

Another object of my invention is to provide a new and improved mounting rack and heat dissipating shield which is inexpensive and which may be readily installed upon the mounting rack for electronic equipment.

Other objects of my invention are to provide an improved device of the character described, that is easily and economically produced, which is sturdy in construction, and which is highly efficient in operation.

With the above and related objects in view, my invention consists in the details of construction and combination of parts, as will be more fully understood from the following description, when read in conjunction with the accompanying drawing, in which.

Figure 1:
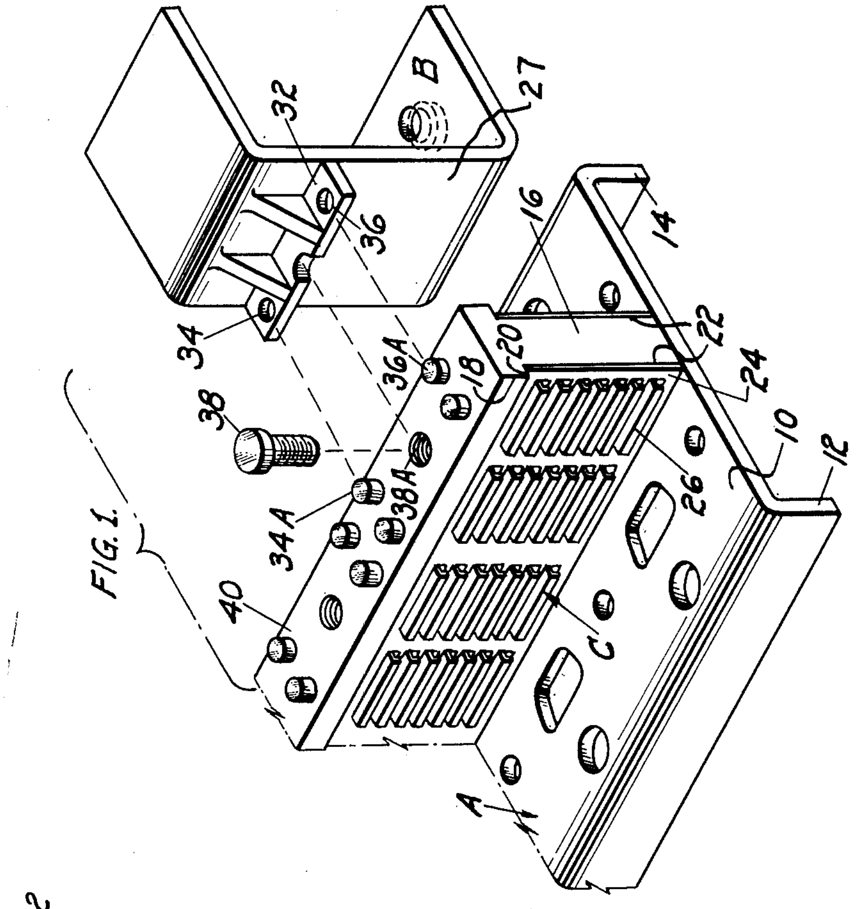
Fig. 1 is a perspective view showing a mounting rack having a plurality of detachable frames wherein the detachable frame may house electronic equipment.

Referring now in greater detail to the drawing, I show a mounting rack, generally designated as A, made of metal or a synthetic resin, which may be located within a casing (not shown). The mounting rack A is adapted to hold one or more U-shaped detachable frames, each of which is generally designated as B. Located between the mounting rack A and the detachable frame B is a heat radiator, generally designated as C. The heat radiator C is adapted to contact an area of the mounting rack A and an area of the detachable metallic frame B and allows air to flow between the rack and the frame whereby heat may transfer from the frame to the rack by convection and by radiation as well as by the cooling effected by air which may be passing through the fingers or flutes.

The mounting rack A has a base 10 with integrally formed down-turned legs 12 and 14. A vertically extending divider 16 is securely mounted to the center of the base 10 to serve as part of the support for the detachable frame B.

The divider 16 has a vertical wall 18 at the upper portion thereof with an inturned flange 20 and a wall 22 offset from the wall 18 to define a recess. Hence, the flange 20 and the outer surfaces of the base 10 provides the limitation as to the height of the heat dissipating radiator C. The metallic heat dissipating radiator C has a flat base portion 24 with a plurality of pressed out fingers 26. The thickness of the radiator C should be slightly greater than the length of the inturned flange 20.

Figures 2, 3, 6, 7:
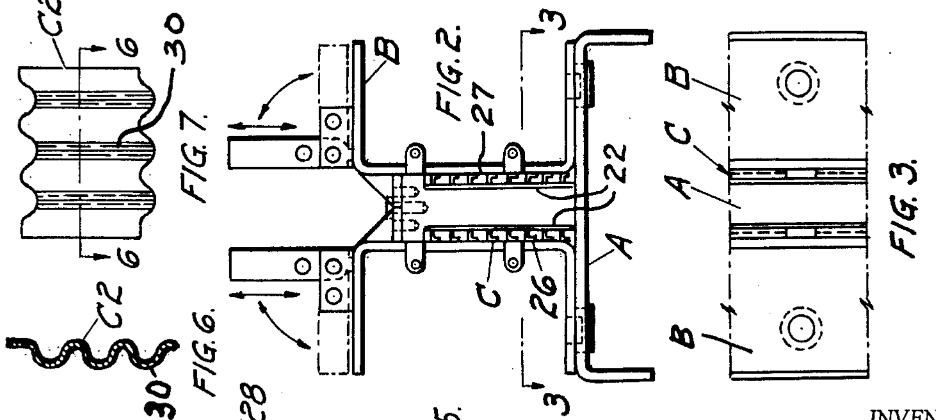
Fig. 2 is an end view of the mounting rack with a detachable frame mounted upon each side of the mounting rack showing the heat radiators in position.
Fig. 3 is a sectional view taken along the line 3—3 of Fig. 2.
Fig. 6 is another modification of a heat radiator showing flutes in the plate.
Fig. 7 is a view of Fig. 6 showing openings in the end of the radiator wherein air may circulate.

The heat dissipating radiator C is positioned against the wall 22 of the divider and the flexible fingers 26 are adapted to press against the surface 28 of the detachable frame B as illustrated in Figs. 2 and 3. When the detachable frame, together with its electronic components (not shown) are mounted upon the rack, heat may be dissipated by conduction; the heat passing through the vertical wall of the detachable metal frame, through the fingers 26 and the base 24 of the heat dissipating radiator.

In Fig. 1 the flexible arms are shown as being horizontally located but they may be formed to be vertically located so that the heated air may rise.

The heat dissipating radiator C may be formed of a substantially rectangular, square, or curved piece of sheet metal such as copper, aluminum or silver and it may have cut or escalloped edges in order to provide for a plurality of air inlet openings. Hot air may flow through the detachable frame and the rack so that a cooling effect may occur.

The resiliency of the spring fingers 26 makes variation between the fit of the surface 27 of the detachable frame B and the wall 22 of the rack immaterial.

The spring members or louvres 26 abutting tightly between the rack A and the mounting frame B, tend to eliminate any vibrational strain between the two members which is very important in telemetering. Usually the frame B has oscillator components housed therein and the heat radiator being tightly wedged between the mounting rack and the detachable frame B effectively minimizes microphonics within electronic tube components. The radiator C may be of a black cadmium finish in order to effect radiation and it may be easily fabricated from sheet material.

Where flutes are used they also enable the hot air to flow so that there is a heat transfer and the flutes also provide for a tight contact between the mounting rack and the detachable frame.

Figures 4, 5:
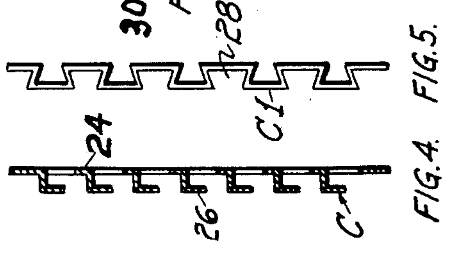
Fig. 4 is a sectional view showing the spring fingers pressed out of a heat conducting plate or heat radiator.
Fig. 5 is a sectional view of a modification of a radiating plate or heater wherein corrugations are shown. Although the plate is illustrated as having the spring member as being located in a horizontal position, the plate may be inserted between the mounting rack and the detachable frame so that the spring members are in a vertical position.

In Fig. 5, a modification of the heat radiator C1 is shown wherein grooves 28 are accordion shaped to be readily compressed to provide a large contact surface; and in Figs. 6 and 7, another modification of the heat radiator C2 has flutes 30 wherein the flutes are terminated in scalloped edges to enable air to pass through the flutes.

It should be observed that the detachable frame B has a flange 32 with openings 34 and 36 so that the flange fits over the projecting openings 34A and 36A which are rigidly formed with the divider 16. A locking nut 38 is adapted to screw into the threads 38A and the head of the screw holds the flange 32 tightly against the surface 40 of the divider 16.

Although my invention has been described in considerable detail, such description is intended as being illustrative rather than limiting, since the invention may be variously embodied, and the scope of the invention is to be determined as claimed.

I claim as my invention:

1. A high density packaged electrical chassis and frame assembly comprising a frame member having a base and an upright side and adapted to support a plurality of electrical circuit components, a mounting rack for detachably receiving the frame, said rack having a base portion and an upright wall provided with a recess therein, a heat dissipating radiator within said recess, said frame being positionable on said rack with its base resting on the base portion of the rack and its upright side together with the upright wall of the rack tightly sandwiching the heat dissipating radiator, and means for detachably locking said frame to the rack.

2. A high density packaged electrical chassis assembly comprising a frame for supporting electrical circuit components and having a base and an upright side, a mounting rack for receiving said frame and having a base and an upright side wall whereby the frame may be placed on the rack with its base engaging the base of the rack and its side proximate the upright wall of the rack, a heat dissipating member positioned between the side of the frame and the wall of the rack and engaging both the wall of the rack and the side of the frame, means for detachably locking the frame and rack together thereby to sandwich said heat dissipating member under pressure between the wall of the rack and the side of the frame, said upright side of the frame and wall of the rack being formed to provide a recess therebetween and said heat dissipating member being accommodated within said recess and having projecting portions to engage both the side of the frame and the wall of the rack, said detachable locking means including a flange outstanding from the side of the frame and a detachable connector means for locking the flange to the wall of the rack.

References Cited in the file of this patent

UNITED STATES PATENTS

| | | |
|---|---|---|
| 1,409,967 | Prat | Mar. 21, 1922 |
| 2,309,232 | Baker et al. | Jan. 26, 1943 |
| 2,602,842 | Morris et al. | July 8, 1952 |
| 2,610,998 | Lockhart | Sept. 16, 1952 |
| 2,658,101 | Coxe | Nov. 3, 1953 |
| 2,745,895 | Lideen | May 15, 1956 |
| 2,807,659 | Woods | Sept. 24, 1957 |
| 2,820,616 | Nabal et al. | Sept. 3, 1958 |
| 2,880,378 | Lindseth | Mar. 31, 1959 |
| 2,890,863 | Scal | June 16, 1959 |
| 2,893,704 | Passman | July 7, 1959 |
| 2,897,033 | Ford | July 28, 1959 |
| 2,935,549 | Woods | May 3, 1960 |

FOREIGN PATENTS

| | | |
|---|---|---|
| 109,538 | Australia | Jan. 25, 1940 |
| 844,630 | Germany | July 24, 1952 |
| 1,100,858 | France | Sept. 26, 1955 |

OTHER REFERENCES

"Unitized Design For Electronic Subassemblies," Electrical Manufacturing (Periodical), published by the Gage Publishing Company, 1250 Sixth Ave., New York 20, N.Y. (January 1953) pages 110 and 112.